United States Patent [19]

Schnarr

[11] 4,199,770

[45] Apr. 22, 1980

[54] COINCIDENCE GATE INK JET WITH INCREASED OPERATING PRESSURE WINDOW

[75] Inventor: Marcus M. Schnarr, Lewisville, Tex.

[73] Assignee: Xerox Corporation, Stamford, Conn.

[21] Appl. No.: 966,435

[22] Filed: Dec. 4, 1978

[51] Int. Cl.² ............................................. G01D 15/18
[52] U.S. Cl. ................................................. 346/140 R
[58] Field of Search ............................... 346/140 R, 75

[56] References Cited

U.S. PATENT DOCUMENTS

| | | | |
|---|---|---|---|
| 3,373,436 | 3/1968 | Auphan | 346/75 |
| 3,493,004 | 2/1970 | Hellbaum | 137/81.5 |
| 3,747,120 | 7/1973 | Stemme | 346/140 X |
| 3,848,118 | 11/1974 | Rittberg | 346/140 X |
| 3,848,258 | 11/1974 | Mahoney | 346/140 R |
| 3,930,260 | 12/1975 | Sicking | 346/140 R |
| 4,104,645 | 8/1978 | Fiscabeck | 346/140 R |

*Primary Examiner*—Joseph W. Hartary

[57] ABSTRACT

In a coincidence vector gate ink jet, a droplet is expressed from an outlet orifice by a coincident pressure produced by a pair of transducers at an outlet orifice. In this type of ink jet, it is normal for one of a cooperating pair of transducers to be activated in a non-coincident mode. In the non-coincident mode, a droplet is not expressed from an outlet orifice as long as the pressure produced by the one transducer remains below a given threshold. A certain type of pressure absorbing chamber is provided for a specific coincident gate ink jet array, which permits this threshold pressure to be substantially increased to a level substantially above the minimum coincident pressure produced by the pair of transducers to express a droplet from the orifice. This increase in the threshold pressure is an increase in the operating window. A greater operating window permits greater latitudes in manufacturing variation and permits greater latitudes in pressure variation to change the size of a droplet to effect halftoning.

8 Claims, 10 Drawing Figures

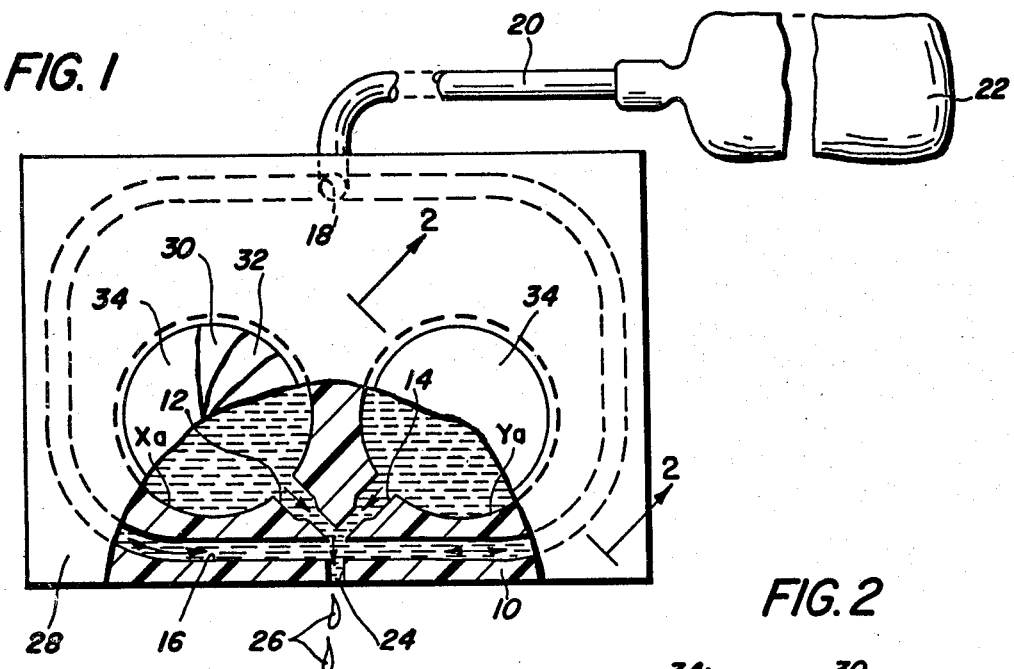
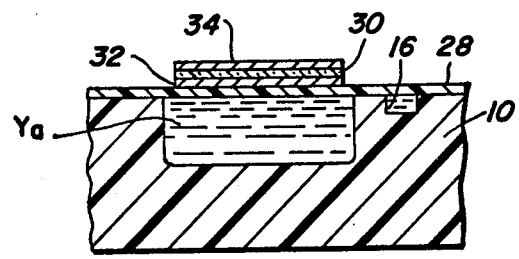
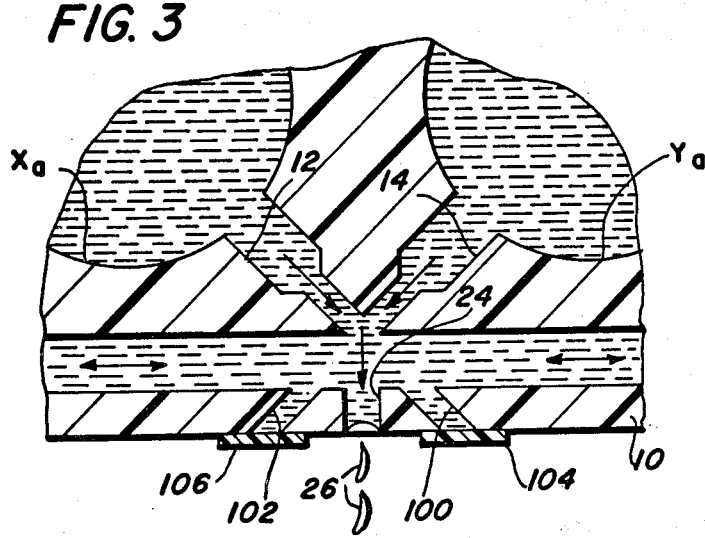

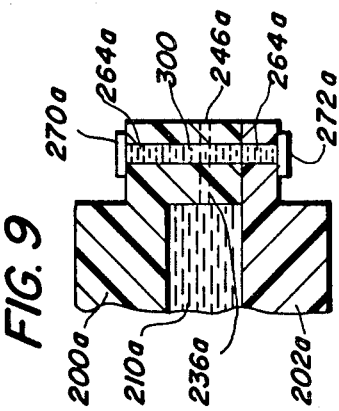
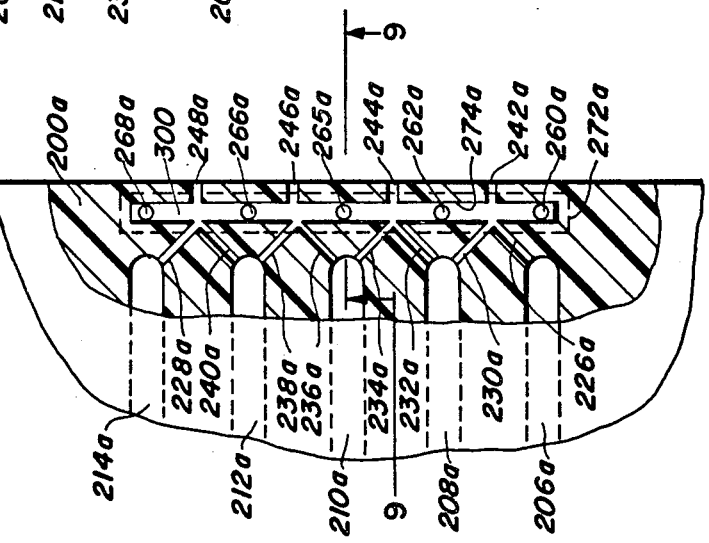
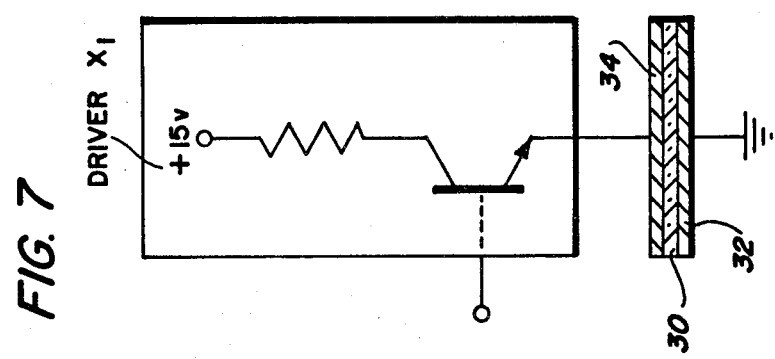

COINCIDENCE GATE INK JET WITH INCREASED OPERATING PRESSURE WINDOW

DESCRIPTION OF THE INVENTION

This application is related to copending U.S. application Ser. No. 966,436, filed Dec. 4, 1978 (common assignee), which discloses the same subject matter but does not specifically claim the subject matter claimed in this application.

This invention relates to a coincidence vector gate ink jet. Coincidence vector gate ink jets are ink jets, which rely upon activation of a particular two transducers to produce a coincident pressure increase at an orifice to express an ink droplet from the orifice. When only one of the transducers is activated in a non-coincident mode, a droplet will not be expressed from the orifice unless a given maximum pressure threshold for one transducer is surpassed. A minimum pressure in each transducer must be maintained to guarantee a droplet when both transducers are activated in the coincident mode. At the present time, the operating window between the maximum and minimum pressures is very limited, not allowing to a significant degree for manufacturing variations or allowing for varying the droplet expression pressures to change the size of droplets for halftoning.

It is an object of this invention to increase the window in operating pressures between a threshold maximum pressure for each transducer and a minimum pressure for each transducer in a particular coincidence gate ink jet array.

Other objects of the invention will become apparent from the following description with reference to the drawings wherein:

FIG. 1 is a cutaway view of a sample ink jet assembly illustrating a coincidence gate principle;

FIG. 2 is a view taken along section line 2—2 of FIG. 1;

FIG. 3 is a modification of the embodiment of FIGS. 1 and 2 illustrating the principle of this invention;

FIG. 7 is a schematic of a typical electronic driver electrically connected to a piezoelectric member;

FIG. 8 is a partial plan view of a modification of the embodiment of FIGS. 4 and 5; and FIG. 9 is a view taken along section line 9—9 of FIG. 8.

Figure 4A:
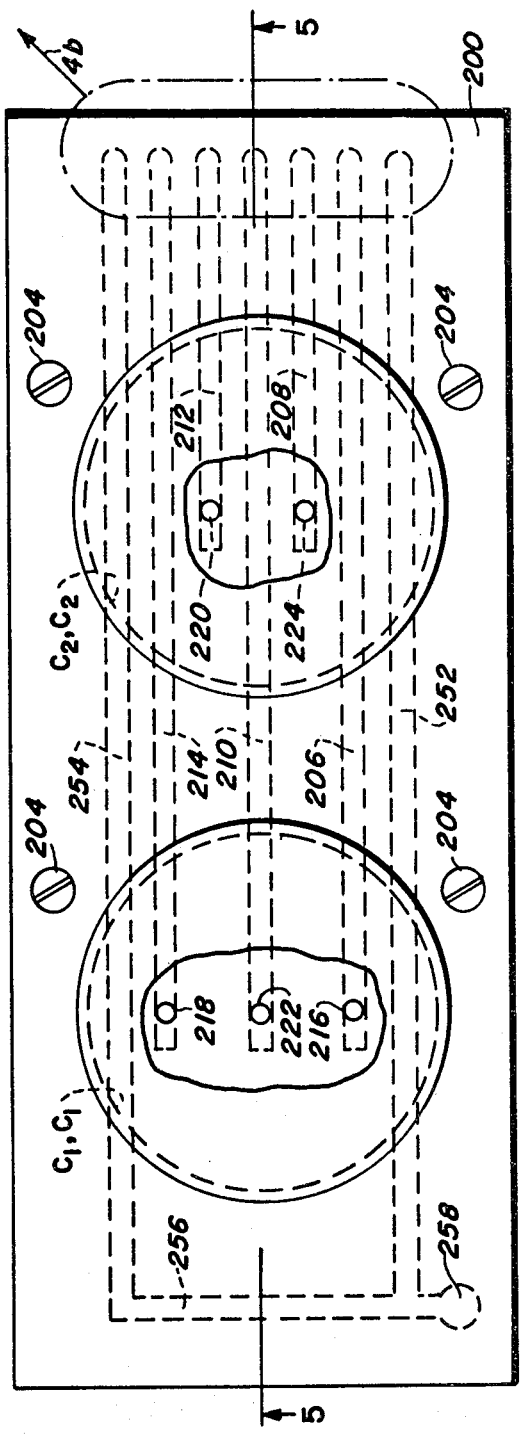
FIG. 4a is a plan view of a linear array ink jet assembly.

Referring to FIG. 1, a cutaway view of a housing member 10 of an ink jet housing assembly is shown illustrating the principles of a coincidence gate ink jet. A pair of transducer chambers $X_a$ and $Y_a$ is provided in the member 10. Fluid pressure passages 12 and 14 lead from the chambers $X_a$, $Y_a$, respectively, to a liquid ink supply rectifier passage 16 where the three passages intersect. The liquid ink supply passage 16 is communicated to a port 18, which in turn is communicated through a conduit 20 to an ink supply reservoir 22, located remotely from the housing, which comprises a sealed flexible bag. Also, at the intersection is an outlet orifice 24 through which ink droplets 26 are expressed onto a copy medium.

Referring to FIG. 2, the chambers and passages are sealed by a flat flexible layer 28 bonded to the member 10. The transducer chambers $X_a$, $Y_a$ are fluid tight except for passages 12 and 14 communicating therewith. The transducer chambers and passages 12, 14 and 16 are completely filled with liquid ink. A piezoelectric ceramic member 30 is sandwiched between and bonded to a pair of electrodes 32 and 34 with the electrode 32 being bonded to the layer 28 thereby effectively bonding the piezoelectric member 30 thereto. The piezoelectric member 30 is polarized during the manufacture thereof to contract in a plane parallel to the plane of the flexible layer 28 when excited by applying a voltage potential across the conductive members 32 and 34. Contraction of the piezoelectric member 30 will cause the flexible layer 28 to buckle inwardly thereby decreasing the volume in its respective chamber and effecting pressure on the liquid ink therein. The members 10 and 28 of the housing may be glass or plastic.

When the piezoelectric member for either transducer $X_a$ or $Y_a$ is activated, a fluid pressure pulse will occur in a respective one of passages 12 and 14 causing displacement of ink along the respective passage. The passages 12 and 14 are at such an angle relative to the orifice 24 that the impedance to liquid flow in passage 16 relative to the impedance to liquid flow in orifice 24, and the magnitude and duration of a pressure pulse exerted by the transducer chambers $X_a$, $Y_a$ are designed such that the ink stream expressed from only one passage at a time will entirely miss orifice 24 and displace ink in the ink supply passage 16 while the ink within orifice 24 will not be disturbed to the extent of expressing a droplet therethrough. The orifice 24 is located relative to the intersection of the passages 12, 14, and the magnitude and duration of the pressure pulse exerted by the transducer chambers $X_a$, $Y_a$ are so designed that the summation vector of the fluid momentum vectors in passages 12 and 14 will lie on the axis of the orifice 24. Thus, only when the piezoelectric members for both transducer chambers $X_a$, $Y_a$ are activated in a manner that pressure pulses generated by the respective transducer coincide at a location from the intersection of passages 12, 14 to the orifice 24 will an ink droplet 26 be expressed from orifice 24.

When only one of the transducers $X_a$, $Y_a$ is activated in a non-coincident mode, a droplet will not be expressed from the orifice 24 unless a given pressure threshold is surpassed. For instance, if it takes 100 psi to express a droplet when the two transducers $X_a$, $Y_a$ are activated in a coincident mode to produce a coincident pressure increase at the orifice, only 50 psi need be produced by each transducer $X_a$, $Y_a$. Also, a pressure increase by only one transducer in a non-coincident mode of approximately 100 psi (threshold) will also produce a droplet from orifice 24. Thus, the maximum pressure exerted by one transducer in a non-coincident mode must be maintained below threshold or, in this case, approximately 100 psi. The minimum pressure must be maintained at 50 psi to assure expression of a droplet from orifice 24 when both transducers are activated in a coincident mode. Thus, the operating window between the maximum and minimum pressures is very limited, not allowing to a significant degree for manufacturing variations or for varying the droplet expression pressures to change the size of droplets for halftoning. An ink droplet size varies with the droplet expression pressure. To halftone, it is desirable to significantly vary the pressure and thereby the drop size. The expression pressure may vary from 100 psi to 500 psi or more. This means that, at the maximum pressure, each transducer $X_a$, $Y_a$, in a coincident mode, must effect a pressure of approximately 250 psi each and still not express a droplet through orifice 24 when only one transducer is activated, in a non-coincident mode, although a combined pressure of 100 psi will produce such a droplet. The principle of this invention is directed toward opening the operating window and is explained with reference to FIG. 3.

Referring to FIG. 3, all elements which are the same as the embodiment of FIG. 1 are designated by the same reference numerals. A pressure absorption chamber 100 is aligned with the passage 12 and located on one side of orifice 24, and a pressure absorption chamber 102 is aligned with the passage 14 and located on the opposite side of the orifice 14. Elastic membranes 104 and 106 seal the outer opening of the chambers 100 and 102, respectively. The membrane 104 may be a thin (1 or 2 mil) Mylar film or other similar flexible material. Each time there is a pressure increase in passage 12 alone, a jet stream will be directed to the aligned chamber 100. The membrane 104 is designed to stretch under pressure to render the chamber 100 a path of least resistance compared to the resistance of the droplet orifice 24 and meniscus formed therein. Since the stream from inlet passage 12 is aligned with the pressure absorption chamber 100, the stream is in shear with the fluid in droplet orifice 24, and a majority of the pressure increase will be absorbed in the absorption chamber 100 by the expansion of the membrane 104. When passage 14 is pressurized, the absorption chamber 102 and elastic membrane 103 act in the same manner as chamber 100 and membrane 104 to absorb a substantial portion of the pressure increase in passage 14 with a very small portion thereof being transmitted to the liquid in the outlet orifice 24.

The provision of pressure absorption chambers 100 and 102 allows a substantial pressure to be produced by either transducer $X_a$, $Y_a$ in a non-coincident mode without expressing a droplet from orifice 24, but yet the pressure for expressing a droplet from orifice 24 by a coincident increase of pressure at the orifice from both transducers will be substantially less. For instance, a combined coincident pressure from both transducers required to express a droplet can be designed to be approximately 100 psi or 50 psi each. However, the maximum pressure produced by one transducer before expressing a droplet may be as high as 250 psi or more due to the provision of the pressure absorbing chamber. Thus, the operating window has been opened where greater latitude with manufacturing variations is possible, and a greater latitude of droplet expression pressures is possible for changing the size of a droplet for halftoning.

Figure 5:
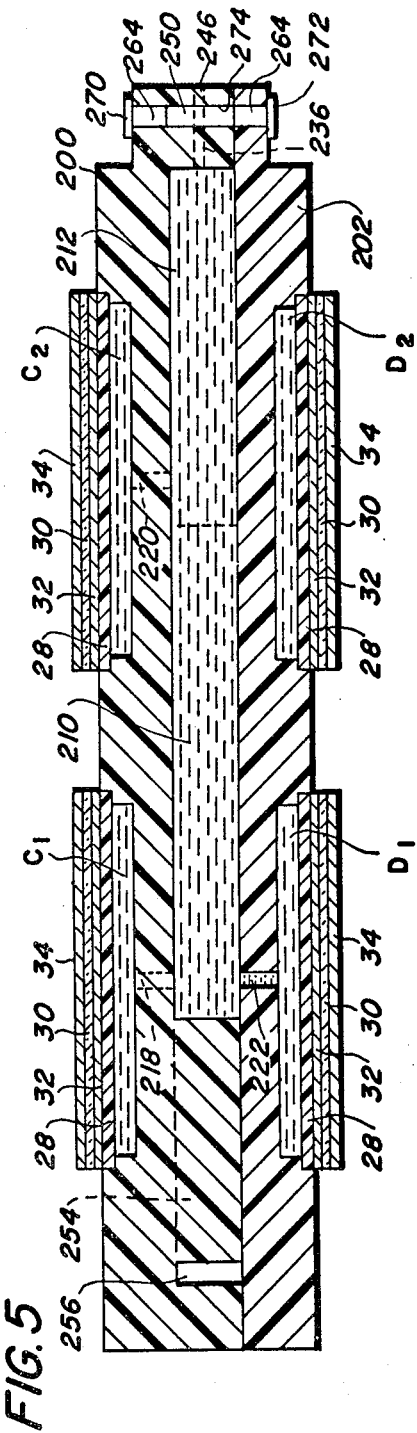
FIG. 5 is a view taken along section line 5—5 of FIGS. 4a and 4b.
Figure 4B:
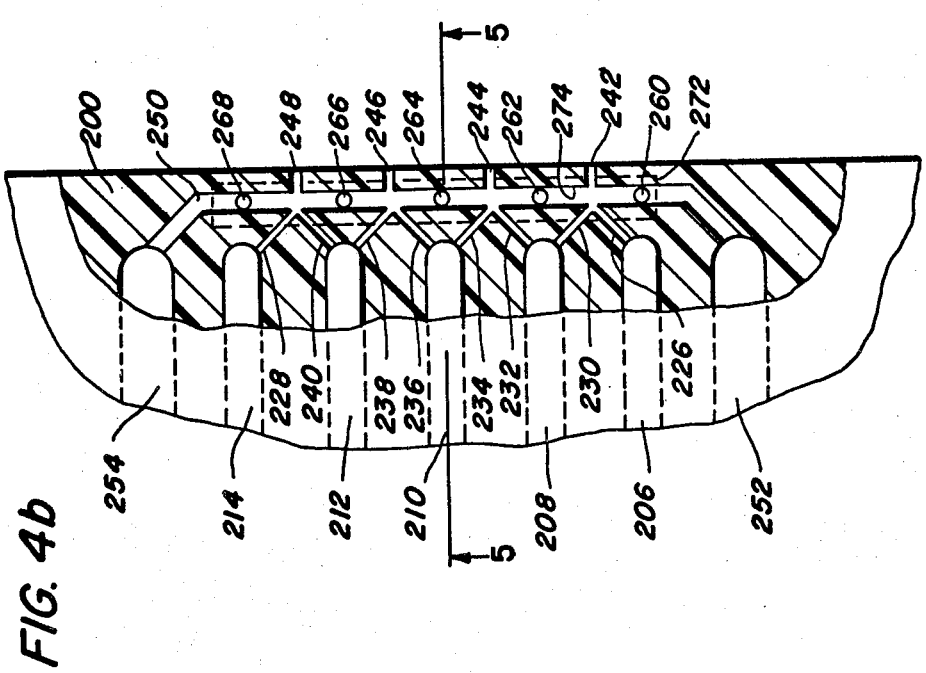
FIG. 4b is a plan detailed view of the circled portion of FIG. 4a labeled as 4b.

Referring now to FIGS. 4a, 4b and 5, a specific coincident gate ink jet array incorporating a chamber for increasing power differential is illustrated. A four-jet array is shown for simplicity, it being sufficient for illustrating the incorporation of the coincidence gate principle and the pressure absorbing principle. A glass or plastic housing comprises two members 200, 202 secured together by screws 204. The member 200 has five channels forming fluid pressure passages 206, 208, 210, 212 and 214. Located in member 200 are fluid transducer chambers $C_1$ and $C_2$, and located in member 202 are fluid transducer chambers $D_1$ and $D_2$. The chamber $C_1$ is communicated to pressure passages 206 and 214 by inless passages 216 and 218, respectively. Chamber $C_2$ is communicated to pressure passages 212 by inlet passage 220. Chamber $D_1$ is communicated to pressure passage 210 by inlet passage 222. Chamber $D_2$ is communicated to pressure passage 208 by inlet passage 224. Referring to FIG. 4b, the pressure passages 206 and 214 each feed into an orifice inlet passage 226 and 228, respectively. The pressure passage 208 feeds into two orifice inlet passages 230 and 232. The pressure passage 210 feeds into two orifice inlet passages 234 and 236, and the pressure passage 212 feeds into two orifice inlet passages 238 and 240. The pair of orifice inlet passages 226 and 230 intersect each other opposite an orifice 242; the pair of orifice inlet passages 232 and 234 intersect each other opposite an orifice 244; the pair of orifice inlet passages 236 and 238 intersect each other opposite an orifice 246; and the pair of orifice inlet passages 240 and 228 intersect each other opposite an orifice 248.

A fluid rectifier chamber 250 extends laterally across the array of orifices and provides a fluid layer between the intersection of each pair of orifice inlet passages and a respective orifice. The rectifier chamber 250 is communicated at one end to a fluid supply passage 252 located in member 200 and at the other end to a fluid supply passage 254, also located in member 200, which fluid supply passages are joined together by a laterally extending supply passage 256 located in member 200. A downwardly extending inlet passage 258 in member 200 is connected to the passage 256 and connected to a fluid supply reservoir (not shown) to communicate the reservoir with the rectifier chamber 250. Each transducer is operated by a piezoelectric member with the same elements thereof as described in FIGS. 1 and 2 being designated by the same reference numerals.

A plurality of laterally spaced, vertically extending pressure absorbing chambers 260, 262, 264, 266 and 268 are in communication with the fluid rectifier chamber 250. The chambers 262, 264 and 266 are located between a respective pair of orifices, and the chambers 260 and 268 are located to one side of orifices 242 and 248, respectively. A flexible membrane 270 spans across the top of the housing 200, and a flexible membrane 272 spans across the bottom of the housing 200 to seal off the pressure absorbing chambers from the exterior. When the pressure is increased in one orifice outlet passage of a cooperative pair, a jet stream will miss the orifice and strike a wall 274 of the fluid rectifier chamber with a resultant pressure surge and turbulence effected thereby being partially transmitted to the absorbing chamber and absorbed by the portion of the membranes 270 and 272 associated therewith. In this particular embodiment, the fluid in chamber 250 absorbs some pressure along with the pressure absorption chambers.

Figure 6:
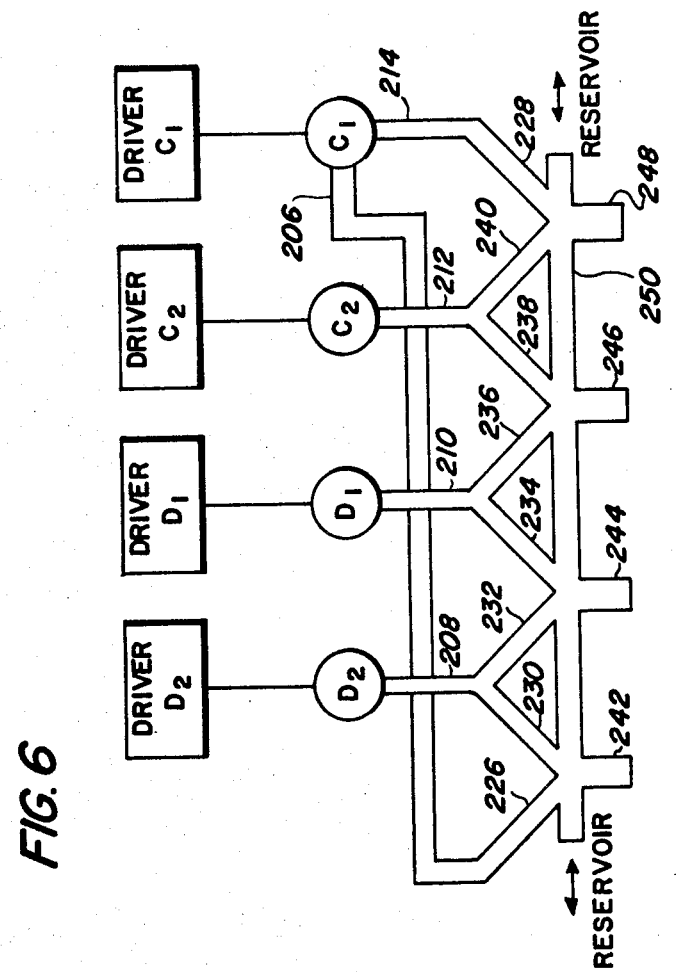
FIG. 6 is a schematic fluid circuit for the ink jet array of FIGS. 4 and 5.

With reference to FIG. 6, the following table shows which jets express droplets therefrom when particular drivers are energized:

| Transducers Cooperatively Engaged | Droplet Expressed From Jet |
|---|---|
| $C_1$, $D_2$ | 242 |
| $D_1$, $D_2$ | 244 |
| $D_1$, $C_2$ | 246 |
| $C_2$, $C_1$ | 248 |

Referring now to FIGS. 8 and 9, a modification of the embodiment of FIGS. 4a, 4b and 5 is illustrated. All elements which are the same as in the embodiment of FIGS. 4a, 4b and 5 designated by the same reference numerals, only with an "an" affixed thereto. This embodiment differs from the embodiment of FIGS. 4a, 4b and 5 in that the fluid supply from the reservoir is fed directly to the transducer chambers. A fluid layer in chamber 300 is provided between the intersection of the intersections of the orifice passages and the orifices. The chambers 260a, 262a, 264a, 266a and 268a and the chamber 300 act together as a pressure absorbing unit.

The membrane sealing the pressure absorbing chambers could be eliminated. In this instance, the maximum pressure absorbed by the chamber would be controlled by the meniscus tension in the chamber as the pressure would have to be kept below a level which could cause ink droplet expression through the unsealed chamber opening. Obviously, this construction would not be as efficient as a construction, which includes the membrane, but the operating window would still be significantly increased.

It should be realized that each transducer does not have to produce substantially equal pressures, but one may produce a major portion of the coincident pressure required to express a droplet.

What is claimed is:

1. An array of coincidence gate ink jets comprising: a housing, a plurality of laterally spaced apart outlet orifices in said housing, each of said orifices having first and second orifice inlet passages communicated therewith, said first and second inlet passages intersecting each other adjacent said orifice, the axis of each of said first and second inlet passages at said intersection being at an angle with the axis of its respective said orifice, said axis of each orifice and its respective inlet passages being in a first general plane generally parallel to the lateral direction, a fluid chamber extending in the lateral direction and being in communication with and interposed between each of said intersections and a respective said orifice, an absorbing chamber located between each pair of adjacent orifices and intersecting said laterally extending fluid chamber, the axis of each absorbing chamber being in a second plane which is generally transverse to said first plane, and means for allowing fluid displacement in each of said absorbing chambers, whereby the minimum pressure required to express a droplet through a respective said orifice upon an increase in pressure in only one of a respective said inlet passages will be increased compared to the minimum pressure required to express a droplet from the orifice of a similar ink jet structure without the absorbing chambers.

2. The structure as recited in claim 1 wherein said means for allowing fluid displacement in each said absorbing chamber comprises an opening in each of said absorbing chambers and an elastic membrane sealing a respective said opening in a respective said absorbing chamber.

3. The structure as recited in claim 1 wherein the axes of a respective said first and second inlet passages at said intersection are generally in a plane, which is generally transverse to the lateral direction in which said outlet orifices are spaced apart, and the axis of a respective said absorption chamber is generally in said plane.

4. The structure as recited in claim 2 wherein the axes of a respective said first and second inlet passages at said intersection are generally in a plane, which is generally transverse to the lateral direction in which said outlet orifices are spaced apart, and the axis of a respective said absorption chamber is generally in said plane.

5. The structure as recited in claim 1 wherein the axes of a respective said first and second inlet passages at said intersection are generally in a plane, which is generally parallel to the lateral direction in which said outlet orifices are spaced apart, and the axis of a respective said absorption chamber is generally in said plane.

6. The structure as recited in claim 2 wherein the axes of a respective said first and second inlet passages at said intersection are generally in a plane, which is generally parallel to the lateral direction in which said outlet orifices are spaced apart, and the axis of a respective said absorption chamber is generally in said plane.

7. The structure as recited in claim 2 further comprising a fluid chamber extending in the lateral direction and being in communication with and interposed between each of said intersections and a respective said orifice, said fluid chamber intersecting each of said absorbing chambers.

8. The structure as recited in claim 7 wherein said fluid chamber is communicated to a fluid supply reservoir.

* * * * *